US00RE42408E

(19) United States
(12) Reissued Patent
Havlik et al.

(10) Patent Number: US RE42,408 E
(45) Date of Reissued Patent: May 31, 2011

(54) OIL PUMP AND GEARS

(75) Inventors: James B. Havlik, Viola, WI (US); Brent Glick, Viola, WI (US); Todd Olson, Viroqua, WI (US)

(73) Assignee: S & S Cycle, Inc., Viola, WI (US)

(21) Appl. No.: 11/058,754

(22) Filed: Feb. 16, 2005

Related U.S. Patent Documents

Reissue of:
(64) Patent No.: 6,729,855
Issued: May 4, 2004
Appl. No.: 10/061,968
Filed: Feb. 1, 2002

(51) Int. Cl.
*F04B 49/00* (2006.01)
*F01C 1/18* (2006.01)
*F01M 1/02* (2006.01)

(52) U.S. Cl. ..... 417/310; 417/308; 418/200; 418/206.5; 123/196 R

(58) Field of Classification Search ..... 417/308, 417/310; 418/9, 200, 206.1, 206.5, 209, 418/210, 212, 213, 215; 123/196 R
See application file for complete search history.

(56) References Cited

U.S. PATENT DOCUMENTS

| | | | | | |
|---|---|---|---|---|---|
| 2,833,224 | A * | 5/1958 | Meyer et al. | 418/83 |
| 2,931,303 | A * | 4/1960 | Dlugos | 418/135 |
| 2,965,036 | A * | 12/1960 | Wood | 417/62 |
| 3,817,117 | A * | 6/1974 | Kita et al. | 74/462 |
| 4,138,204 | A * | 2/1979 | Bruguera | 417/300 |
| 4,277,230 | A * | 7/1981 | Muller | 418/131 |
| 4,758,130 | A * | 7/1988 | Waterworth | 417/236 |
| 5,135,371 | A * | 8/1992 | Arbogast et al. | 418/124 |
| 5,244,367 | A * | 9/1993 | Aslin | 418/104 |
| 5,496,163 | A * | 3/1996 | Griese et al. | 418/200 |
| 6,227,833 | B1 * | 5/2001 | Frøslev et al. | 418/170 |
| 6,612,822 | B2 * | 9/2003 | Buschur et al. | 418/171 |

FOREIGN PATENT DOCUMENTS

| | | | | |
|---|---|---|---|---|
| JP | 57052695 | A * | 3/1982 | 418/200 |
| JP | 357052695 | A * | 3/1982 | |

OTHER PUBLICATIONS

Eugene Avallone et al.; Marks' Standard Handbook for Mechanical Engineers 10th Edition; McGraw-Hill (Jun. 1, 1996) (6 pgs.).
S&S Cycle Catalogue No. 13; Lower End Standard Oil Pumps, pp. 6-43 to 6-47 (Feb. 2002) (5 pgs.).
S&S Cycle Catalog No. 13, Standard Oil Pumps, LowerEnd, pp. 6-43 to 6-47, Copyright by S&S Cycle, Inc., Feb. 2002.

* cited by examiner

*Primary Examiner* — Charles G Freay
(74) *Attorney, Agent, or Firm* — Price, Heneveld, Cooper, DeWitt & Litton LLP

(57) ABSTRACT

An oil pump for an internal combustion engine includes a pump body with a first gear chamber and a second gear chamber, and a cover mounting to the pump body. The pump also has a check valve and a pressure relief valve in fluid communication with the gear chambers. The oil pump has a supply set of intermeshing involute spur gears in the first gear chamber with nine involute teeth. A return set of intermeshing involute spur gears with the same gear profile as the supply gears is housed in the second gear chamber. Both sets of gears are driven by a common drive shaft so that the pump may be retrofitted to existing engines. The profile of the gears provides for improved pump volume without increasing angular velocity or gear diameter over gears of the prior art. The return gears are deeper than the supply gears to provide an improved supply to return flow ratio.

44 Claims, 6 Drawing Sheets

OIL PUMP AND GEARS

Matter enclosed in heavy brackets [ ] appears in the original patent but forms no part of this reissue specification; matter printed in italics indicates the additions made by reissue.

FIELD OF THE INVENTION

The present invention relates to a motorcycle oil pump, and in particular, to an oil pump having intermeshing gears with an improved tooth design that provides improved flow over the prior art.

BACKGROUND OF THE INVENTION

Internal combustion engines such as those for motorcycles typically have an oil pump that is a dry sump-type system with two sets of intermeshing external rotary gears. The gears are typically driven on a common drive shaft with one gear set supplying pressurized oil to the engine for lubrication, with the other gear set scavenging excess oil from the crankcase to the oil tank. Oftentimes, the oil pump does not provide sufficient oil for the engine, especially through certain RPM ranges. In other applications, performance modifications may be made to the engine that require increased oil flow to provide proper lubrication as the stock oil pump does not have sufficient capacity.

In order to accommodate increased oil flow, a simple solution is to provide a larger capacity oil pump. However, a larger capacity pump requires additional space that may not be available and prevents retrofitting to an existing engine. Therefore, it is desirable to utilize an oil pump having the same space requirements as a stock pump. It is also desirable to mount to the existing drive shaft to minimize the modifications required to mount to the engine. If an existing oil pump is used, one modification that provides increased flow is to widen the gear sets or increase the depth of the gears. However, clearance constraints may prohibit widening of the gears or may limit the depth of the gears. Another solution is to increase the angular velocity of the gears. This method of providing increased flow is undesirable as it may increase the wear of the current pump and require more maintenance. It also requires increasing the angular velocity of the drive shaft or adding a gear intermediate the drive shaft and the pump gears.

Another alternative is to change the gear profile. A typical stock oil pump gear includes fourteen teeth, as shown in FIG. 1. An improved gear tooth profile may provide for pumping a larger volume of oil and maintaining a higher oil pressure, overcoming the pressure problems associated with some engines. An improved gear tooth profile could provide for utilizing gears that may replace the stock gears and provide improved flow with an identical outer radius and RPM.

Another problem with existing oil pumps is that the ratio between oil supply volume and oil return volume is not optimized. Under some operating conditions, the engine may be overwhelmed by oil. The crankcase then becomes filled, resulting in oil carryover, wherein excessive oil is blown out of the crankcase breather.

It can be seen that a new pump is needed that provides improved flow over existing designs. Such an oil pump should provide increased oil flow without requiring additional space for the oil pump. Such a design should provide for retrofitting existing oil pumps with an improved gear tooth profile, resulting in increased oil pumping volume. Such a system should provide for optimization of the pump flow for the supply as well as the pump flow ratio between the supply and the return. The present invention addresses these as well as other problems related to oil pumps for internal combustion engines.

SUMMARY OF THE INVENTION

The present invention is directed to a dry sump type oil pump system that utilizes intermeshing spur gears having an improved tooth profile for improved pumping and volume.

A motorcycle engine oil pump includes a pump body and a cover. The pump body includes two sets of gears, intermeshing supply gears and intermeshing return gears. The gears are spur gears having nine teeth with an improved involute tooth profile. The profile of the gears and greater intermeshing provide improved flow over the prior art. The present invention provides for retrofitting to existing engines as the gears can be fitted in a body and cover having the same outer dimensions. The gear chambers are modified slightly to accommodate the different distance between the gear centers due to the greater tooth overlap from greater intermeshing. However, the driven supply gear and return gear are coaxial with the existing drive shaft to provide for retrofitting. In addition, the depth of the supply gears and return gears is increased over the prior art so that improved flow is achieved without greater angular velocity and without a greater diameter.

The oil pump also includes various passages for directing oil to the various components to be lubricated and for reclaiming oil from the oil tank and sump. The oil pump also includes a check valve and a pressure relief valve that are set to accommodate the increased flow over the prior art. With the optimized placement of various passages and levels, as pressure increases and the plunger of the relief valve and ball of the check valve are moved, oil is directed to different components at the various pressures, thereby providing lubrication to components as the need arises.

With the improved gear design, pump volume for the supply gears is increased by thirty eight percent over a comparable pump of the prior art while the return gears increase pump volume by sixty one percent as compared to the prior art. This is achieved without increasing gear angular velocity, gear diameter, or the width of the pump body and cover assembly and utilizing existing geometry that are compatible with existing engines.

These features of novelty and various other advantages that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings wherein like reference numerals and letters indicate corresponding structure throughout the several views.

DETAILED DESCRIPTION OF THE PREFERRED EMBODIMENT

Figure 1:
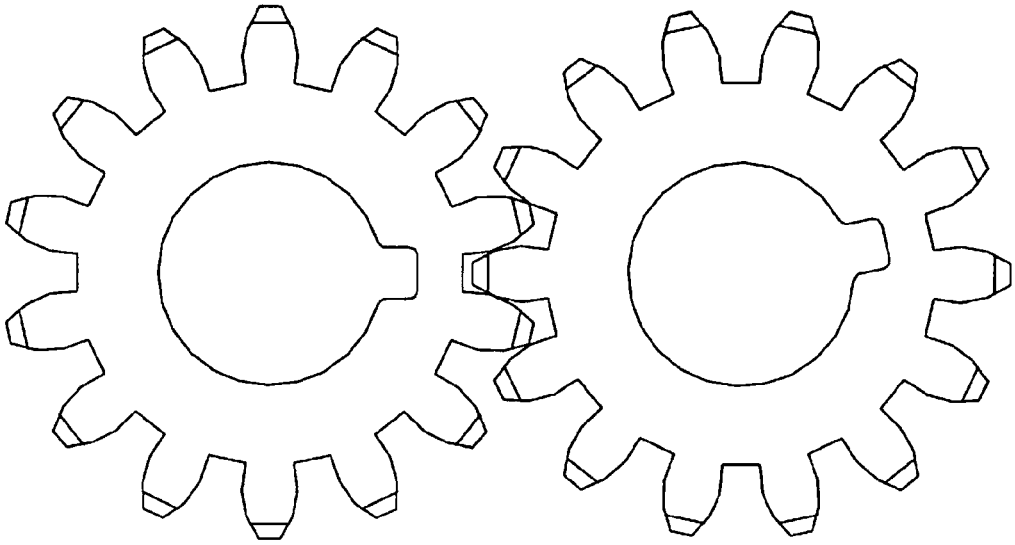
FIG. 1 (PRIOR ART)
FIG. 1 is a side view of a set of prior art gears.

Referring now to the drawings, and in particular to FIG. 1, there is shown a prior art set of gears for an oil pump. The gear set is typical of both oil supply gears and return gears. Each of the gears has fourteen teeth that intermesh to feed oil for lubrication of various engine components or to aid in return of oil flowing from the components. The intermeshing teeth of the prior art are relatively shallow with a profile that cannot provide sufficient flow and lubrication under some engine operating conditions. In order to improve flow while providing for use with existing engines, the maximum diameter of the gears is limited.

Figure 2:
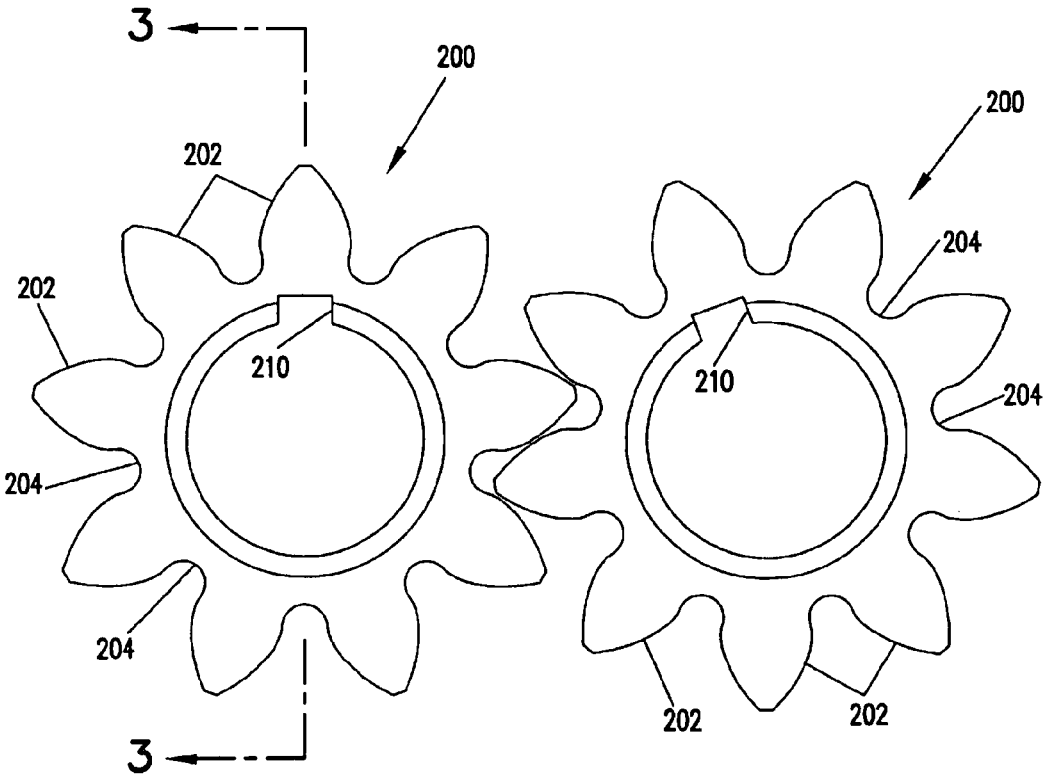
FIG. 2 is a side view of a set of oil pump gears according to the principles of the present invention.
Figure 3:
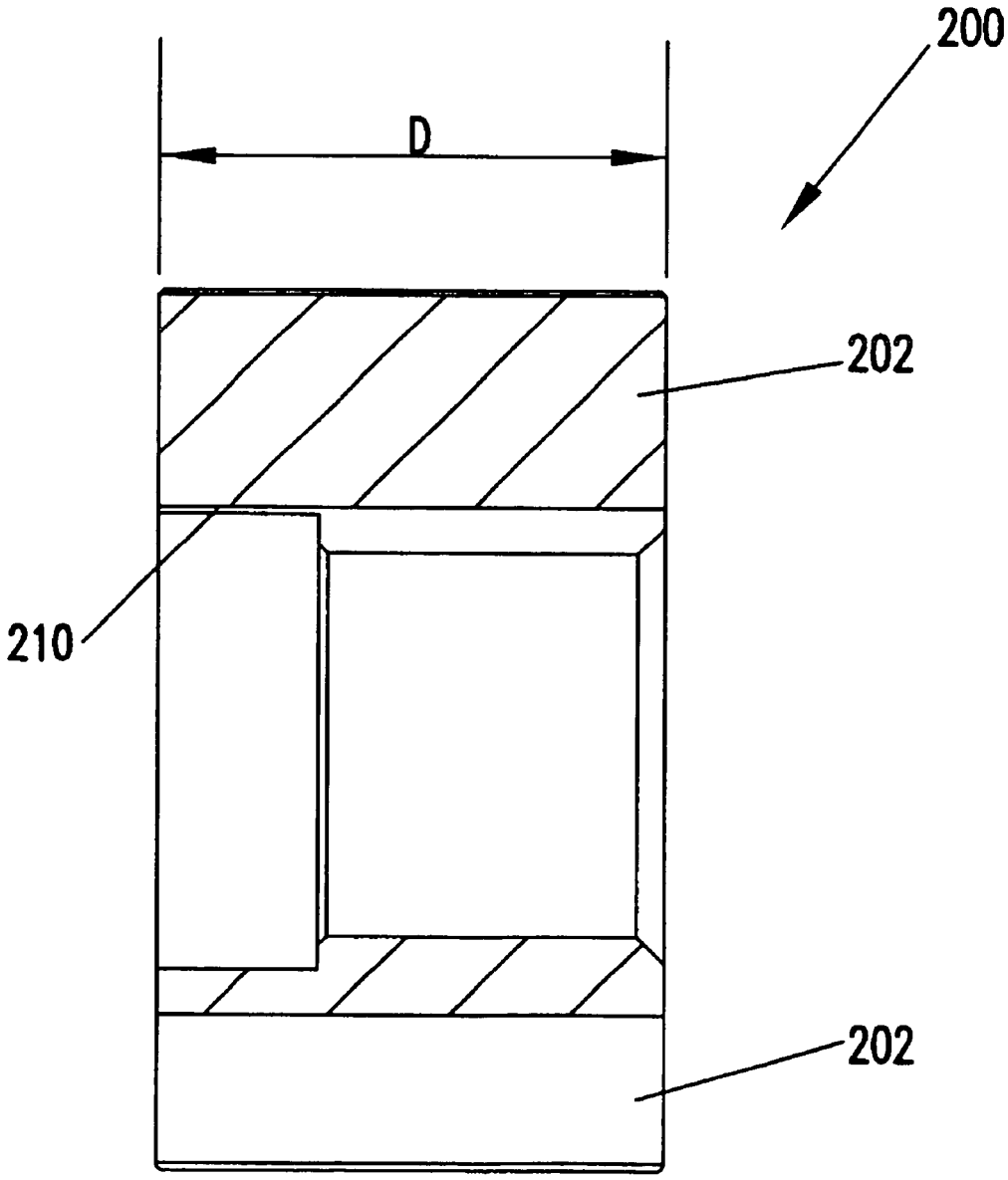
FIG. 3 is a sectional view taken along line 3—3 of FIG. 2.

Referring to FIGS. 2 and 3, gears 200 according to the present invention are shown. Intermeshing involute spur gears 200 provide improved flow and performance as compared to the prior art gears. As explained hereinafter, the gears 200 are typical of either supply or return gears as each of the gears has the same profile and the description of the gears 200 applies to all gears. Each gear includes nine involute teeth 202 with a root 204. In one embodiment, the gears 200 have a pitch circle with a diameter of 0.811 inches and a root diameter of 0.585 inches. The gears 200 may include a keyway 210 for receiving a drive shaft key. The diametral pitch, which is the number of teeth per inch of pitch circle diameter is 12. The pressure angle, which is the angle between a line of action and the common tangent to the pitch circle at the pitch point, for the gears 200 is twenty degrees. The pitch point is the point of contact between pitch circles of two gear in mesh. The pitch circle is the circle representing the original cylinder that transmitted motion by friction of a gear. It has been found that the gears having the number of teeth with the dimensions and profiles as shown, provides the improved performance desired. In the embodiment shown, the depth D of the gears 200 is 0.55 inches for supply gears and 0.8 inches for return gears, thereby improving pumping ratios and decreasing oil carryover. These depths may be varied depending on the engine application, whether supply or return.

Figure 4:
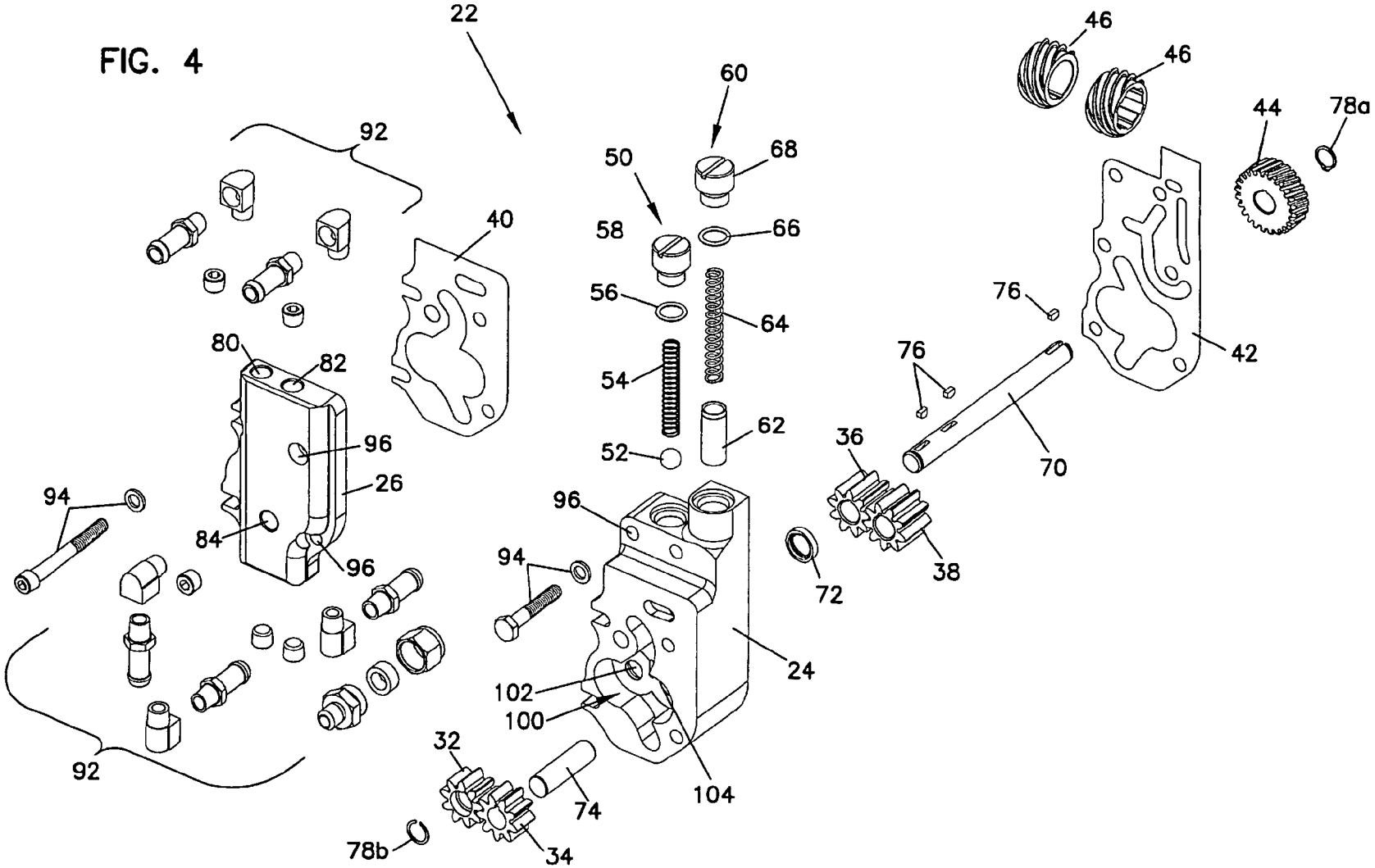
FIG. 4 is an exploded perspective view of an oil pump according to the principles of the present invention with gears having the profile shown in FIG. 2.

Referring now to FIG. 4, there is shown an oil pump for an internal combustion engine such as is used in a motorcycle, generally designated 22. The pump includes a body 24 and cover 26 mounting to the body 24. A supply driven gear 32 and supply idler gear 34 interact to supply oil to the various components of the engine. The gears 32 and 34 have the same profile as shown in FIGS. 2 and 3. Return driven gear 36 and return idler gear 38 intermesh provide return oil flow. The gears 36 and 38 have the same profile as shown for the gears 200 in FIGS. 2 and 3. The supply gears 32 and 34 mount in chamber 100 while the return gears 36 and 38 mount in a return gear chamber 110 on an opposite side of the pump body 24. In the embodiment shown, the supply gears 32 and 34 have a depth that is less than that of the return gears 36 and 38 to optimize flow. Both sets of gears are driven off of a single drive shaft 70. The idler gears 34 and 38 rotate about an idler shaft 74. The drive shaft 70 extends through an orifice 102 in the chambers 100 and 110 while the idler shaft 74 extends through an orifice 104. Keys 76 extend into the keyway (shown as 210 in FIGS. 2 and 3) of the driven gears 32 and 36, as shown in FIG. 4. The gear sets 32, 34 and 36, 38 include snap rings 78A and 78B to retain the drive shaft 70 and a drive shaft seal 72 to eliminate leakage through the orifices in the gears around the drive shaft 70. The drive shaft 70 mounts to a drive gear 44 and utilizes a key 76. The drive gear 44 is in turn driven by pinion shaft pump drive gears 46. Other drive gear arrangements of other engine configurations may also be used. Pump body gasket 42 mounts to one side of the pump body 24 while pump cover gasket 40 mounts between the pump body 24 and the cover 26.

To accommodate mounting, orifices 96 receive hardware 94 for attaching the pump cover 26 to the pump body 24 as well as mounting the pump 22 to the engine. Connections to the lubricated components are made through fittings, generally designated 92 and attaching to various openings, as explained hereinafter.

The pump 22 includes a check valve assembly 50 mounting through an opening 90 extending downward from the top of the valve body 24. Check valve assembly 50 includes a ball 52 biased by spring 54. Gasket 56 and plugs 58 retain the spring and ball. The operation of the check valve 50 and its relationship to oil flow is explained hereinafter.

A pressure relief valve 60 mounts into relief valve opening 88 extending downward from the top most portion of the pump body 24. A spring biases the plunger downward through the valve opening 88 and is retained by gasket 66 and plug 68. The operation of the pressure relief valve 60 and its relationship to oil flow is explained hereinafter.

Figure 6:
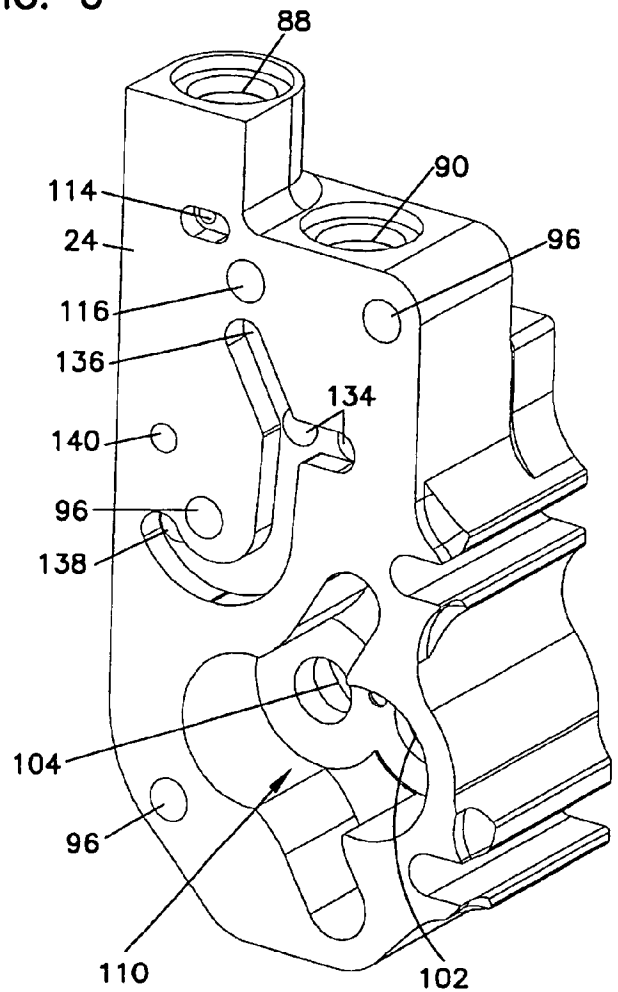
FIG. 6 is an opposite side perspective view of the housing shown in FIG. 5.
Figure 5:
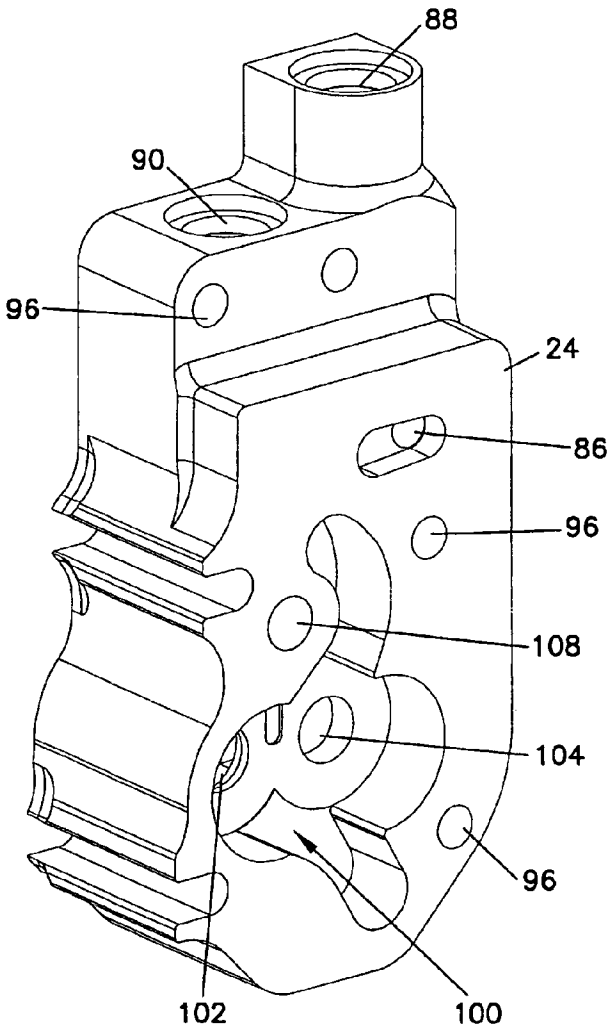
FIG. 5 is a perspective view of a housing for the oil pump shown in FIG. 4.

Referring now to FIGS. 5 and 6, the various passages and chambers of the valve body 24 are shown. Mounting holes 96 receive hardware to connect the cover 26 as well as to mount the pump 22. As shown in FIG. 5, the supply gear chamber 100 includes orifices 104 and 102 that extend through to chamber 110, shown in FIG. 6. Orifice 102 receives the drive shaft 70 shown in FIG. 4 while orifice 104 receives the idler shaft 74, also shown in FIG. 4.

It can be appreciated that the profile of the gears 200 provides for a greater degree of intermeshing for increased flow and pumping from greater volume in the space between the intermeshing gear teeth. However, with the greater degree of intermeshing, the rotational centers of the gears are moved closer to one another if the outer diameter of the gears is maintained. Therefore, the orifices 102 and 104 are moved closer together as compared to pumps in the prior art. In order to accommodate mounting to a drive shaft for retrofitting of a pump on the present invention to an existing motorcycle engine, the position of orifice 102 must not be moved in the pump body 24 to mount to the drive shaft 70. Therefore, the chamber 100 is modified and orifice 104 is moved closer to orifice 102. The chamber 100 is also slightly narrower than a comparable chamber of the prior art. Moreover, the depth of the supply gear chamber 100 is slightly deeper to accommodate the greater depth of the gears 32 and 34.

Likewise, the return gears 36 and 38, have a gear profile as shown in FIGS. 2 and 3 for the gear 200. With a greater degree of intermeshing, the orifices 102 and 104 are moved the same degree to accommodate the return gears and align them with the supply gears. It can be appreciated that the shape and size of the pump body 24 does not need to be increased to accommodate the gear sets 32 and 34, and 36 and 38. Therefore, the pump body 24 may be retrofitted to an existing engine within the space constraints of the prior pump, while maintaining alignment for actuating the pump 22, with the existing drive shaft 70. The depth of the return gears 36 and 38 is increased over the gears of the prior art and is greater than the depth of the supply gears 32 and 34 to optimize flow.

Figure 9:
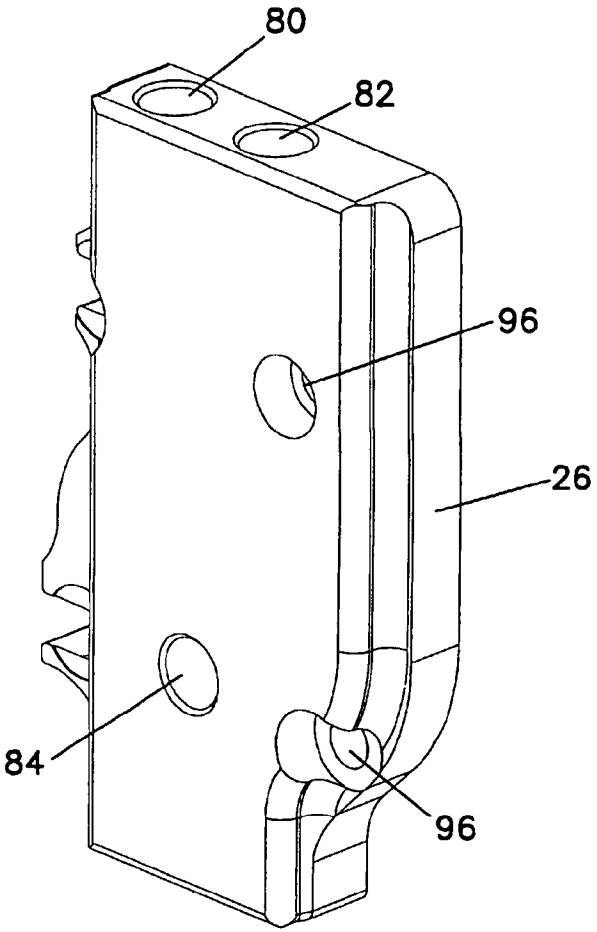
FIG. 9 is an outer perspective view of the housing cover shown in FIG. 7.
Figure 7:
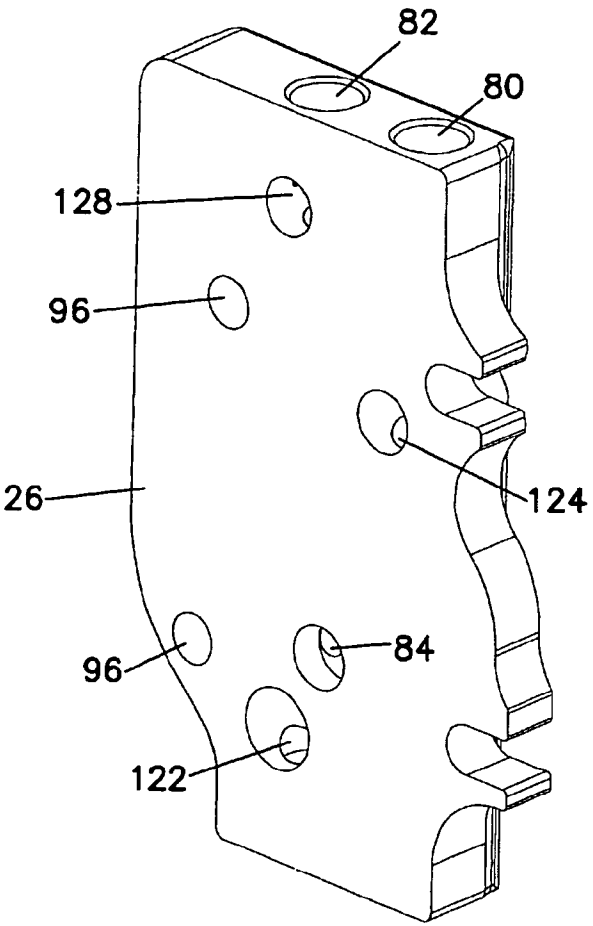
FIG. 7 is an inner perspective view of a housing cover for the oil pump shown in FIG. 4.
Figure 8:
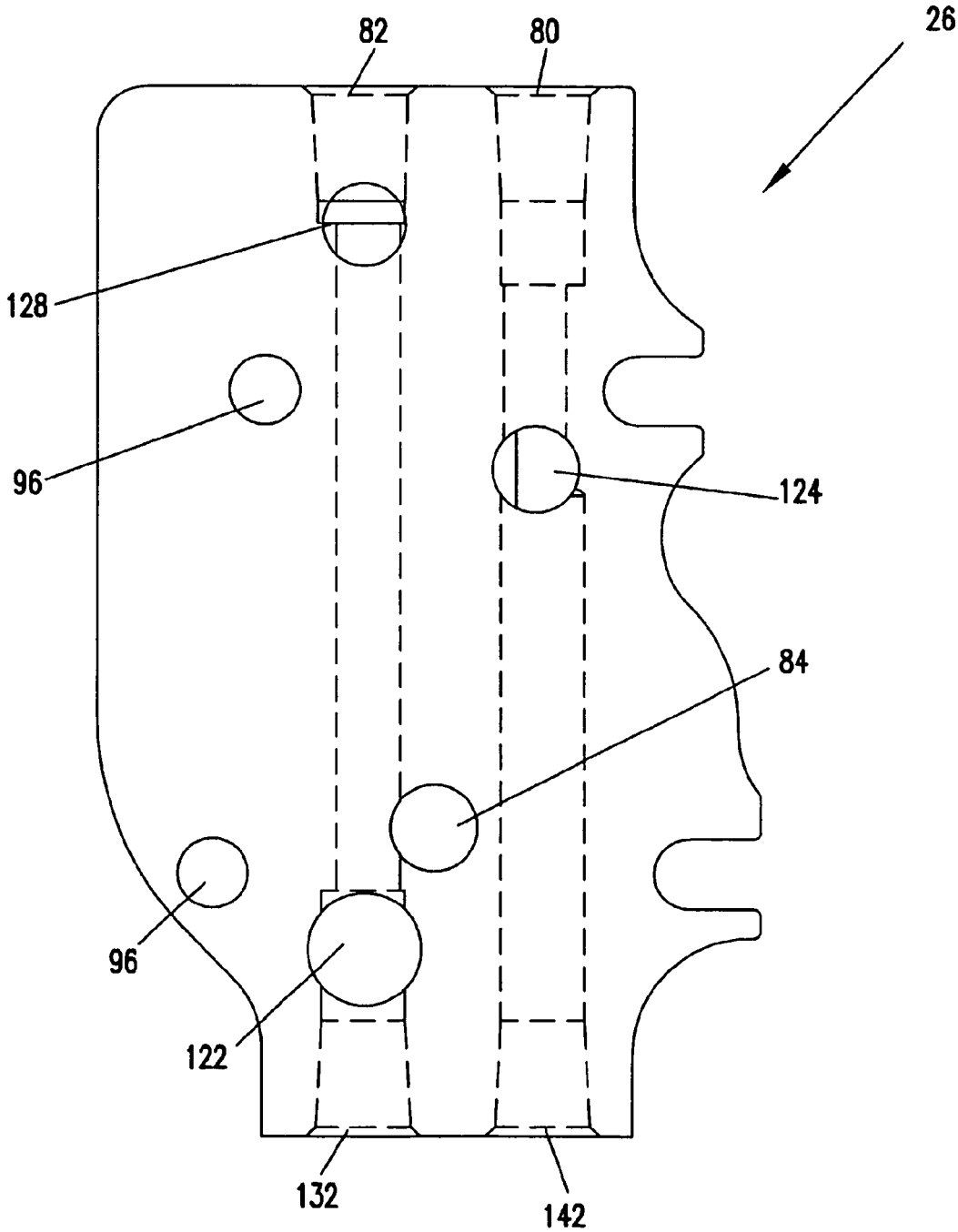
FIG. 8 is an elevational view of the inner side of the housing cover shown in FIG. 7.

Regarding oil flow, oil to the pump can enter from the oil tank through upper and lower openings 82 and 132, as well as a middle oil supply hole 84 in the cover 26, shown most clearly in FIGS. 8 and 9. Oil flows to supply pump gears feed passage 122 in the cover 26 to the suction side of the supply gear set at a lower lobe of the supply gear chamber 100. At the upward extending lobe from the supply gear chamber 100, oil is pressurized and engages the ball 52 and check valve assembly 50. The check valve assembly 50 prevents oil from entering the engine when the engine is not running.

As shown in FIG. 6, when the oil reaches the bypass 134, due to increased pressure, the check valve 50 is actuated and oil is channeled to a crankcase passage 136 above the bypass 134. This passage 136 directs oil to the top end elements, including lifters, push rods, rocker arms, valve guides and piston oilers of the engine, which require continuous pressurized flow of oil. This is also where the oil pressure is indicated. The oil flows downward to a lower access passage 138 for the relief valve 60. The oil pressure raises the plunger 62 that uncovers various passages including a lower end crankcase passage 140 that directs oil to the crankshaft and connecting rods of the engine. The pressure relief valve 60 raises so that this passage 140 is uncovered at about 10 psi. Increased pressure raises the plunger 62 further allowing oil to flow through excess oil passageway 86 acting as a pressure relief passage at about 30 psi. Oil is channeled to a relief passage 128 leading back to the supply gears. The pressure relief passage 128 ensures that the motor does not have excessive oil pressure and prevents over oiling the engine or rupture of the various gaskets. The lower end crankcase passage 140 is moved slightly upward and the excess oil passage 86 is moved slightly downward as compared to the prior art, to take advantage of the higher oil pressure associated with the new pump from the higher dynamic oil pressure due to the higher flow achieved by the improved gears 32 and 34 of the present invention. The relief valve 60 also includes a pressure relief drain passage 114. The pressure relief drain passage 114 provides for directing small quantities of oil that may slip by the plunger 62 and prevents hydraulic lock.

Oil flow for the return side of the pump 22 includes a passage leading to the lower lobe for the return gear chamber 110 under suction from the crankcase. Oil is pumped through the return gear set 36 and 38 and is directed through a return passage 108 directing the oil back to the cover and passage 124. Oil is routed to either an upper oil return hole 80 or lower oil return hole 142 in the cover 26.

The external spur gear sets 32 and 34, and 36 and 38 of the present invention are driven off a common drive shaft 70 to accommodate the prior art geometry. The present invention uses an improved spur gear with an involute tooth profile to increase the oil pumping volume by 26% due to the improved profile of the gears. The depth of the gears is increased so that the volume of the supply side is increased by 38% over the prior art, while volume on the return side is increased by 61%. These increases are achieved without increasing the diameter of the gears and allows for utilizing an improved pump that can be retrofitted to existing engines. In addition, the angular velocity of the gears is not increased over the prior art so that there is no adverse effect from increased wear. The body of the pump is easily modified to accommodate the gears 32, 34, 36 and 38 without increasing the size of the pump body. Moreover, the present invention improves the return to supply ratio by changing the gear depth so that the engine is not overwhelmed with oil that would fill the crankcase resulting in excessive oil being blown out of the crankcase breather. It can be appreciated that the improved oil pumping gears of the present invention provide improved performance while allowing for retrofitting to existing engines without modifying the engine, pump mounting or attachment to the oil pump drive shaft.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An internal combustion engine oil pump, comprising:

a pump body, including a first gear chamber and a second gear chamber;

a cover mounted to the pump body;

a drive shaft extending into the first gear chamber and the second gear chamber;

a first set of intermeshing involute spur gears in the first gear chamber, wherein each of the first set of gears has nine or fewer teeth, wherein each tooth has an involute profile[;], and wherein one of the first set of gears is driven by the drive shaft; and a second set of intermeshing involute spur gears in the second gear chamber, wherein one of the second set of gears is driven by the drive shaft[; and], wherein [the] *a* ratio of [the] *a* depth of the first set of gears to [the] *a* depth of the second set of gears is about 11/16*;*

*wherein at least one of the gears in the first and second sets has an orifice for receiving the drive shaft; and*

*a snap ring retaining the drive shaft, the snap ring being recessed in the orifice to eliminate leakage around the drive shaft*.

2. An oil pump according to claim 1, further comprising a check valve in fluid communication with one of the first and second gear chambers.

3. An oil pump according to claim 1, further comprising a pressure relief valve in fluid communication with the one of the first and second gear chambers.

4. An oil pump according to claim 1, wherein each of the second set of gears has nine or fewer teeth, and wherein each tooth has an involute profile.

5. An oil pump according to claim 1, wherein [the] *a* diametral pitch of the first set of gears is 12.

6. An oil pump according to claim 1, wherein [the] *a* pressure angle of the first set of gears is about 20 degrees.

7. A method of increasing oil flow in an *internal combustion engine, comprising:*

*providing the internal combustion engine, the engine having a first* oil pump, the *first oil* pump having a *first* body, a *first* cover, a first set of intermeshing supply gears and a first set of intermeshing return gears driven off a common [drift] *drive* shaft[, the method comprising the steps of:]*;* replacing the first [set of supply gears with] *oil pump with a second oil pump fitting into a same dimensional space but that provides increased oil flow, the second oil pump including a second body,* a second set of supply spur gears *and a second set of return gears*, wherein each of the second set of supply gears has nine involute teeth[;], *and*

[replacing the first set of return gears with a second set of return spur gears,] wherein each of the second set of return gears has nine involute teeth[;], wherein *a* distance between the axes of the second set of supply gears is less than [the] *a* distance between the axes of the first set of supply gears, and wherein *a* distance between the axes of the second set of return gears is less than [the] *a* distance between the axes of the first set of return gears*;*

*the first and second bodies each including an identical pattern of mounting apertures for attachment to the engine and having identical bore locations for receiving the drive shaft.*

8. A method according to claim 7, wherein the second set of return gears has a greater depth than the second set of supply gears.

9. A method according to claim 8, wherein [the] *a* ratio of [the] *a* depth of the second set of supply gears to [the] *a* depth of the second set of return gears is about 11/16.

10. An oil pump *for an internal combustion engine*, comprising:

a pump body, including a first gear chamber and a second gear chamber;

a cover mounted to the pump body;

a check valve in fluid communication with one of the first and second gear chambers*, the check valve being operably connected to the one chamber and configured to prevent oil from flowing through the one chamber when the engine is not running but configured to actuate and release oil to a crankcase passage when actuated with a predetermined oil pressure*;

a pressure relief valve in fluid communication with the one of the first and second gear chambers*, the pressure relief valve being operably connected to the one chamber and configured to uncover a lower end crankcase passageway at about 10 psi and to uncover an excess oil passageway at about 30 psi*;

a drive shaft extending into the first gear chamber and the second gear chamber;

a first set of intermeshing involute spur gears in the first gear chamber, wherein each of the first set of gears has nine or fewer teeth, wherein each tooth has an involute profile[;], and wherein one of the first set of gears is driven by the drive shaft;

a second set of intermeshing involute spur gears in the second gear chamber, wherein one of the second set of gears is driven by the drive shaft[; and], wherein [the] *a* ratio of [the] *a* depth of the first set of gears to [the] *a* depth of the second set of gears is about 11/16 *such that a greater volume of oil is pumped for return than for supply, since the oil being pumped for return includes more air than the oil being pumped for supply*.

11. An oil pump according to claim 10, wherein each of the second set of gears has nine or fewer teeth.

12. An oil pump according to claim 11, wherein the teeth comprise involute gear teeth.

13. An oil pump according to claim 10, wherein the diametral pitch of the first gears is 12.

14. An oil pump according to claim 10, wherein the pressure angle of the gears is about 20 degrees.

*15. A retrofit engine oil pump designed to fit onto an internal combustion engine and to replace an existing oil pump of the internal combustion engine, the engine defining a pattern including mounting holes and a drive-shaft-receiving aperture, and the existing pump including a first body with first attachment holes matching the pattern, a first drive shaft aligned with the drive-shaft-receiving aperture, and existing sets of intermeshing gears having rotational centers defining a known distance, the retrofit engine oil pump comprising:*

*a retrofit pump body including first and second gear chambers and also second attachment holes matching the pattern and also drive-shaft-supporting structure aligned with the drive-shaft-receiving aperture; such that the second pump is mountable in place of the existing oil pump;*

*a cover mounted to the retrofit pump body, the cover closing one side of the first gear chamber of the retrofit pump body;*

*the retrofit pump body being configured and adapted so that, when mounted, the engine closes a side of the second gear chamber of the retrofit pump body;*

*a retrofit drive shaft supported by the drive-shaft-supporting structure and extending into the first gear chamber and the second gear chamber;*

*a first set of intermeshing gears in the first gear chamber, wherein one of the first set of gears is driven by the retrofit drive shaft; and*

*a second set of intermeshing gears in the second gear chamber, wherein one of the second set of gears is driven by the retrofit drive shaft,*

*wherein a first distance between rotational centers of the first set of intermeshing gears in the first gear chamber equals a second distance between rotational centers of the second set of intermeshing gears in the second gear chamber, and*

*wherein the first distance and the second distance are less than the known distance between the rotational centers of corresponding gears in the existing oil pump.*

*16. An oil pump according to claim 15, wherein a ratio of a depth of the first set of gears to a depth of the second set of gears is about 11/16.*

*17. An oil pump according to claim 15, further comprising a check valve in fluid communication with one of the first and second gear chambers.*

*18. An oil pump according to claim 15, further comprising a pressure relief valve in fluid communication with the one of the first and second gear chambers.*

*19. An oil pump according to claim 15, wherein a diametral pitch of the first set of gears is 12.*

*20. An oil pump according to claim 1, wherein a pressure angle of the first set of gears is about 20 degrees.*

*21. An oil pump according to claim 15, wherein the first set of intermeshing gears comprise involute spur gears having nine or fewer teeth.*

*22. An oil pump according to claim 15, wherein the second set of intermeshing gears comprise involute spur gears having nine or fewer teeth.*

*23. An oil pump according to claim 15, wherein the retrofit oil pump comprises an external gear rotary oil pump.*

*24. An oil pump according to claim 15, wherein the first set of intermeshing gears and the second set of intermeshing gears have a pitch circle diameter of 0.811 inches.*

*25. A method of providing increased oil flow in an engine comprising steps of:*

*providing a motorcycle engine including a first oil pump with a first pump body and first intermeshing supply gears with centers defining a first distance and first intermeshing return gears with centers also defining the first distance; the first pump body defining a first set of attachment orifices arranged in a first pattern for aligning with existing mounting structure on the engine for attachment;*

*constructing a second oil pump with a second pump body and second intermeshing supply gears with centers defining a second distance and second intermeshing return gears also with centers defining the second dis-*

*tance; the second distance being less than the first distance; the second pump body defining a second set of attachment orifices arranged in the first pattern for aligning with the existing mounting structure on the engine for attachment; the first intermeshing supply and return gears providing an increased rate of oil flow than the second intermeshing supply and return gears; the second pump body being configured to fit within a same space on the engine as the first pump body; and*

*replacing the first pump by detaching the first pump and then attaching the second pump, including using the existing mounting structure on the engine and including fitting into the same space on the engine.*

*26. The method defined in claim 25, wherein the step of constructing the second pump includes providing the second intermeshing supply and return gears with an involute spur tooth profile shaped to increase oil pump volume at a same rpm by at least 26%.*

*27. The method defined in claim 26, wherein the step of constructing the second pump includes providing the second intermeshing supply gears with an involute spur tooth profile to increase oil pump volume at a same rpm on a supply side by at least supply 38%.*

*28. The method defined in claim 26, wherein the step of constructing the second pump includes providing the second intermeshing return gears with an involute spur tooth profile and depth to increase oil pump volume at a same rpm on a return side by at least supply 61%.*

*29. The method defined in claim 25, wherein the step of constructing the second pump includes providing on the second pump body a relief valve opening and a pressure relief valve mounted to the relief valve opening, and opening the relief valve at an oil pressure of at least about 10 psi to provide oil to selected components of the engine.*

*30. The method defined in claim 25, including further opening the relief valve at an oil pressure of at least about 30 psi to flow excess oil through an excess oil passageway acting as pressure relief passage to prevent both over pressure and over oiling.*

*31. The method defined in claim 25, wherein the step of constructing includes forming a keyway channel in one of the gears that aligns with a base of a tooth in the one gear.*

*32. The method defined in claim 25, wherein the step of constructing includes forming a recess for a snap ring within a drive-shaft-receiving orifice in one of the gears, and including placing the snap ring within the one gear in the recess.*

*33. The oil pump according to claim 25, wherein the first set of intermeshing gears and the second set of intermeshing gears have a pitch circle diameter of 0.811 inches.*

*34. The oil pump according to claim 33, wherein a diametral pitch of the first set of gears is 12.*

*35. The oil pump according to claim 34, wherein a pressure angle of the first set of gears is about 20 degrees.*

*36. An apparatus comprising:*

*a vehicle engine having limited space for pumping oil;*

*a first oil pump with a first pump body and first intermeshing supply and return gears with rotational centers defining a first distance; the first pump body defining first attachment orifices arranged in a first pattern for attaching to the engine in the limited space;*

*a second oil pump with a second pump body and second intermeshing supply and return gears with rotational centers defining a second distance less than the first distance; the second pump body defining a second set of attachment orifices arranged in the first pattern for attaching to the engine; the second intermeshing supply and return gears providing an increased oil flow of at least 26% over the first intermeshing supply and return gears; and*

*whereby the first pump can be replaced by detaching the first pump and then attaching the second pump without further modification or change of style of the vehicle engine.*

*37. The apparatus defined in claim 36, including a keyway in one of the gears in the second oil pump that aligns with a base of one tooth and that is adapted to matingly engage a drive shaft extending through the one gear.*

*38. The apparatus defined in claim 36, including a recess in one of the gears in the second oil pump and a snap ring in the recess within the one gear that retains a drive shaft and that limits leakage around the drive shaft.*

*39. A method of improving distribution and flow of oil in an internal combustion engine, comprising:*

*providing a motorcycle engine including a pattern of existing oil-pump-mounting structure and confined space around the oil-pump-mounting structure;*

*removing a stock oil pump having a first pump body with first intermeshing gears; and*

*attaching a second oil pump to the existing oil-pump-mounting structure, the second oil pump including a second pump body of equal size to the first pump body, first and second gear chambers, intermeshing supply and return gears providing an increased oil flow but having rotational centers closer together than the first intermeshing gears; a check valve in fluid communication with one of the first and second gear chambers, the check valve being operably connected to the one chamber and configured to prevent oil from flowing through the one chamber when the engine is not running but configured to actuate and release oil to a crankcase passageway when actuated with a predetermined oil pressure, and a pressure relief valve in fluid communication with the one of the first and second gear chambers, the pressure relief valve being operably connected to the one chamber and configured to uncover a lower end crankcase passageway at less than 10 psi and to uncover an excess oil passageway at more than 30 psi.*

*40. The method defined in claim 39, including operating the motorcycle engine to cause oil pressure fluctuations of greater than 10 psi but less than 30 psi, and also to cause oil pressure fluctuations of greater than 30 psi.*

*41. The method defined in claim 7, including forming a keyway in one of the gears for engaging the drive shaft, including aligning the keyway with a base of one tooth.*

*42. The method defined in claim 7, including forming a recess in one of the gears for receiving a snap ring to retain the drive shaft and to prevent leakage around the drive shaft.*

*43. The oil pump defined in claim 15, including a keyway in one of the gears for engaging the drive shaft, the keyway being aligned with a base of one tooth of one of the gears.*

*44. The oil pump defined in claim 15, including a recess in one of the gears for receiving a snap ring to retain the drive shaft and to prevent leakage around the drive shaft.*

* * * * *